US008464360B2

(12) United States Patent
Sugimoto et al.

(10) Patent No.: US 8,464,360 B2
(45) Date of Patent: Jun. 11, 2013

(54) INFORMATION PROCESSING APPARATUS AND IMAGE PROCESSING PROGRAM

(75) Inventors: Yasuaki Sugimoto, Hachioji (JP); Takeshi Nakajima, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1051 days.

(21) Appl. No.: 11/961,868

(22) Filed: Dec. 20, 2007

(65) Prior Publication Data
US 2008/0172734 A1 Jul. 17, 2008

(30) Foreign Application Priority Data

Jan. 15, 2007 (JP) ................................ 2007-005699

(51) Int. Cl.
*H04L 29/06* (2006.01)
(52) U.S. Cl.
USPC .................................. 726/28; 726/27; 726/34
(58) Field of Classification Search
None
See application file for complete search history.

(56) References Cited

U.S. PATENT DOCUMENTS

| | | | | |
|---|---|---|---|---|
| 5,757,916 | A * | 5/1998 | MacDoran et al. | 380/258 |
| 6,490,687 | B1 * | 12/2002 | Nagai | 726/9 |
| 7,500,107 | B2 * | 3/2009 | Arnouse | 713/186 |
| 7,624,424 | B2 * | 11/2009 | Morita et al. | 726/1 |
| 2002/0138632 | A1 * | 9/2002 | Bade et al. | 709/229 |
| 2004/0181695 | A1 * | 9/2004 | Walker | 713/202 |
| 2004/0225894 | A1 * | 11/2004 | Colvin | 713/200 |
| 2005/0055547 | A1 * | 3/2005 | Kawamura | 713/155 |
| 2007/0055888 | A1 * | 3/2007 | Miller et al. | 713/186 |
| 2007/0083915 | A1 * | 4/2007 | Janakiraman et al. | 726/4 |
| 2007/0101438 | A1 * | 5/2007 | Govindarajan | 726/27 |
| 2007/0150827 | A1 * | 6/2007 | Singh et al. | 715/773 |
| 2009/0216587 | A1 * | 8/2009 | Dwivedi et al. | 705/7 |

FOREIGN PATENT DOCUMENTS

| | | | | |
|---|---|---|---|---|
| JP | 2001-175601 | | | 6/2001 |
| JP | 2002-049591 | | | 2/2002 |
| JP | 2002117377 | A | * | 4/2002 |
| JP | 2005-071327 | | | 3/2005 |
| JP | 2005115493 | A | * | 4/2005 |
| JP | 2005-339153 | | | 12/2005 |
| JP | 2006-102948 | | | 4/2006 |
| JP | 2006-229429 | | | 8/2006 |
| JP | 2006203300 | A | * | 8/2006 |

OTHER PUBLICATIONS

Japanese Office Action dated Mar. 31, 2009.
Japanese Office Action dated Jan. 6, 2009.

* cited by examiner

*Primary Examiner* — Nathan Flynn
*Assistant Examiner* — Michael R Vaughan
(74) *Attorney, Agent, or Firm* — Finnegan, Henderson, Farabow, Garrett & Dunner, L.L.P.

(57) ABSTRACT

There is described an information processing apparatus, which makes it possible to prevent a third party from stealing and using data owned by the correctly access-authorized person, so as to securely control the data concerned. The information processing apparatus includes: a data storage section to store data; an acquiring section to acquire positional information of an access-authorized person and a control section to determine whether or not an accessing operation for accessing to the data stored in the data storage section should be allowed, based on a determined result thereof. When the external terminal device tries to access into the data stored in the data storage section or the storing area of the data, the control section transmits a request of inputting authentication information to the external terminal device, in order to determine whether or not the accessing operation to be conducted by the external terminal device should be allowed.

18 Claims, 7 Drawing Sheets

INFORMATION PROCESSING APPARATUS AND IMAGE PROCESSING PROGRAM

This application is based on Japanese Patent Application NO. 2007-005699 filed on Jan. 15, 2007 with Japan Patent Office, the entire content of which is hereby incorporated by reference.

BACKGROUND OF THE INVENTION

The present invention relates to an information processing apparatus and an information processing program for managing data stored on HDD or the like.

In recent years, there has been much development in the network environment and data is often shared between multiple terminals. For example, a folder may be setup on the shared server on a network, and shared data is saved in this folder and the data can be viewed from a plurality of terminals. Because the shared data may include highly confidential data such as personal information, in the case where the data is shared on a plurality of terminals, sufficient security measures must be established such that the data is not stolen by a third party.

An example of the security technology used when accessing the data saved in the shared server on the network include the technology described in Unexamined Japanese Patent Application Publication No. 2006-102948 (Hereinafter referred as Patent Document 1). In the technology described in Patent Document 1, when the document storage server is accessed, user authentication is done using the account information, and if there is no problem with user authentication, access to the document data stored in the document storage server is permitted. In this manner, theft of the document data is prevented by performing user authentication using the account information.

In addition, instead of a server on a network, multiple people may share a digital multifunction peripheral (one with copy, print and fax function) which has a HDD (hard disk drive) loaded therein. In the case where multiple people use the HDD of the multifunction peripheral, portions of the HDD may be assigned to the user as boxes and image data read by a scanner is saved in the boxes. Because in some cases, the image data in the box is confidential data, when the image data file inside the box, or the box itself which is the storage location for the image data is accessed, data theft by a third party is prevented by requiring a prescribed password.

However, if the account information or the password itself is stolen by a third party, the third party may use the account information and pretend to be an access-authorized person, and thus can access the data stored on the server. That is to say, a sufficient security system is not established by simply using account information and password.

SUMMARY OF THE INVENTION

To overcome the abovementioned drawbacks in conventional information processing apparatuses and conventional information processing programs, it is one of objects of the present invention to provide an information processing apparatus and an information processing program, each of which makes it possible to prevent a third party, who pretends to be an access-authorized person, from stealing and using data owned by the correctly access-authorized person, so as to securely control the data concerned.

Accordingly, to overcome the cited shortcomings, at least one of the objects of the present invention can be attained by the information processing apparatuses and the computer readable medium storing a computer executable program, described as follows.

(1) According to an information processing apparatus reflecting an aspect of the present invention, the information processing apparatus that is accessible from an external terminal device, comprises: a data storage section to store data; an acquiring section to acquire positional information of an access-authorized person, with respect to the data stored in the data storage section or a storing area, established within the data storage section, for storing the data concerned; and a control section to determine whether or not an accessing operation for accessing to the data stored in the data storage section or the storing area of the data from the external terminal device should be allowed, in order to control the data storage section, based on a determined result thereof; wherein, when the external terminal device tries to access into the data stored in the data storage section or the storing area of the data, the control section transmits a request of inputting authentication information to the external terminal device; and wherein, when the authentication information inputted by the external terminal device coincides with predetermined authentication information, the control section determines whether or not the accessing operation to be conducted by the external terminal device should be allowed, based on identification information inherent to the external terminal device currently accessing, and the positional information of the access-authorized person, in respect to the storing area established within the data storage section for storing the data currently accessed, acquired by the acquiring section.

(2) According to an information processing apparatus reflecting another aspect of the present invention, the information processing apparatus that is accessible from an external terminal device, comprises: a data storage section to store data; an acquiring section to acquire positional information of an access-authorized person, with respect to the data stored in the data storage section or a storing area, established within the data storage section, for storing the data concerned; and a control section to determine whether or not an accessing operation for accessing to the data stored in the data storage section or the storing area of the data from the external terminal device should be allowed, in order to control the data storage section, based on a determining result thereof; wherein, when the external terminal device tries to access into the data stored in the data storage section or the storing area of the data, the control section transmits a request of inputting first authentication information to the external terminal device; and wherein, when the first authentication information inputted by the external terminal device coincides with first predetermined authentication information, the control section determines whether or not another request of inputting second authentication information should be transmitted to the external terminal device, based on the identification information inherent to the external terminal device currently accessing, and the positional information of the access-authorized person, in respect to the storing area established within the data storage section for storing the data currently accessed, acquired by the acquiring section.

(3) According to a computer readable medium reflecting still another aspect of the present invention, the computer readable medium storing a computer executable program for conducting information processing operations to be implemented in an information processing apparatus that is accessible from an external terminal device, the program comprises program code for causing a computer to perform the steps of: storing data into a data storage section; acquiring positional information of an access-authorized person, with respect to the data stored in the data storage section or a storing area, established within the data storage section, for storing the data concerned; and determining whether or not an accessing operation for accessing to the data stored in the data storage section or the storing area of the data from the external terminal device should be allowed, in order to control the data storage section, based on a determined result thereof; wherein, when the external terminal device tries to access into the data stored in the data storage section or the storing area of the data, a request of inputting authentication information is transmitted to the external terminal device; and wherein, when the authentication information inputted by the external terminal device coincides with predetermined authentication information, it is determined whether or not the accessing operation to be conducted by the external terminal device should be allowed, based on identification information inherent to the external terminal device currently accessing, and the positional information of the access-authorized person, in respect to the storing area established within the data storage section for storing the data currently accessed, acquired in the acquiring step.

(4) According to a computer readable medium reflecting yet another aspect of the present invention, the computer readable medium storing a computer executable program for conducting information processing operations to be implemented in an information processing apparatus that is accessible from an external terminal device, the program comprises program code for causing a computer to perform the steps of: storing data into a data storage section; acquiring positional information of an access-authorized person, with respect to the data stored in the data storage section or a storing area, established within the data storage section, for storing the data concerned; and determining whether or not an accessing operation for accessing to the data stored in the data storage section or the storing area of the data from the external terminal device should be allowed, in order to control the data storage section, based on a determined result thereof; wherein, when the external terminal device tries to access into the data stored in the data storage section or the storing area of the data, a request of inputting authentication information is transmitted to the external terminal device; and wherein, when the first authentication information inputted by the external terminal device coincides with first predetermined authentication information, it is determined whether or not another request of inputting second authentication information should be transmitted to the external terminal device, based on the identification information inherent to the external terminal device currently accessing, and the positional information of the access-authorized person, with respect to the storing area, established within the data storage section, for storing the data currently accessed, acquired in the acquiring step.

BRIEF DESCRIPTION OP THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
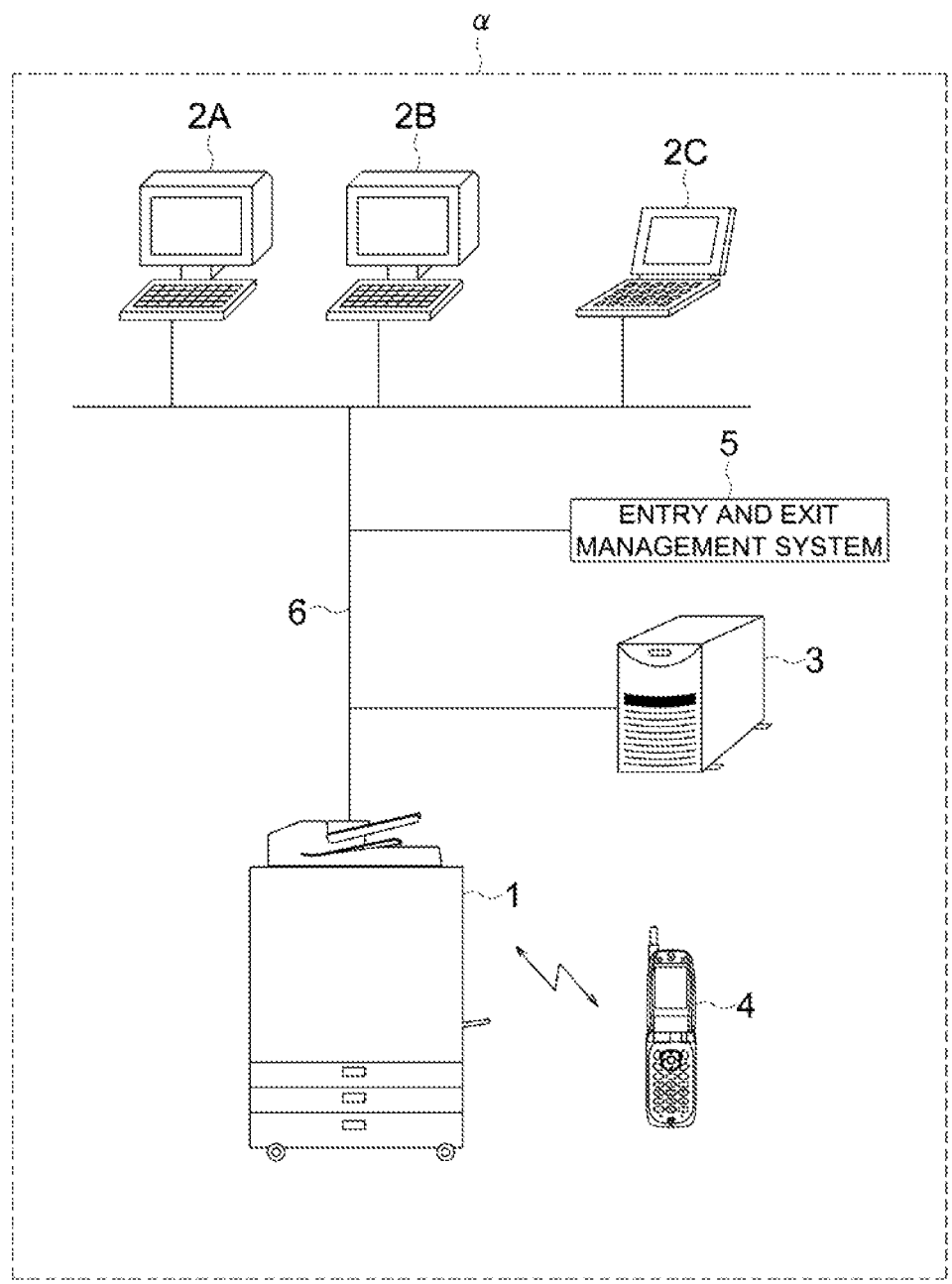
FIG. 1 is a schematic view of the network system including the information processing apparatus.

FIG. 1 is a schematic view of the network system including the information processing apparatus.

The information processing apparatus 1 is installed in room α and the information processing apparatus 1 is used by a plurality of people present in room α.

A plurality of external terminals 2A, 2B and 2C are connected to the information processing apparatus 1 via the LAN 6, and the data stored in the information processing apparatus 1 can be viewed by the plurality of external terminals 2A, 2B and 2C. The shared server 3 is also connected to the information processing apparatus 1 via the LAN 6 and data exchange is performed between the shared server 3 and the information processing apparatus 1.

In addition, the information processing apparatus 1 may send electronic mail or make telephone calls to a mobile phone terminal 4. In the case where the data stored in the information processing apparatus 1 is accessed from the external terminal via the LAN 6, the information processing apparatus 1 sends the necessary information to the mobile phone terminal 4 of the owner of the data (or access-authorized person) accessed.

The entry and exit management system 5 manages information about who is present in the room α. The room α has a door (not shown) for entry and exit and when someone enters or exits room α, the detection sensor that is installed at the entry and exit door reads the ID cards of registered people. Due to this configuration, information about who is present in the room can be obtained in the entry and exit management system 5. Because the information processing apparatus 1 is connected to the entry and exit management system 5 via the LAN 6, the information processing apparatus 1 can obtain information about who is present in the room from entry and exit management system 5.

Figure 2:
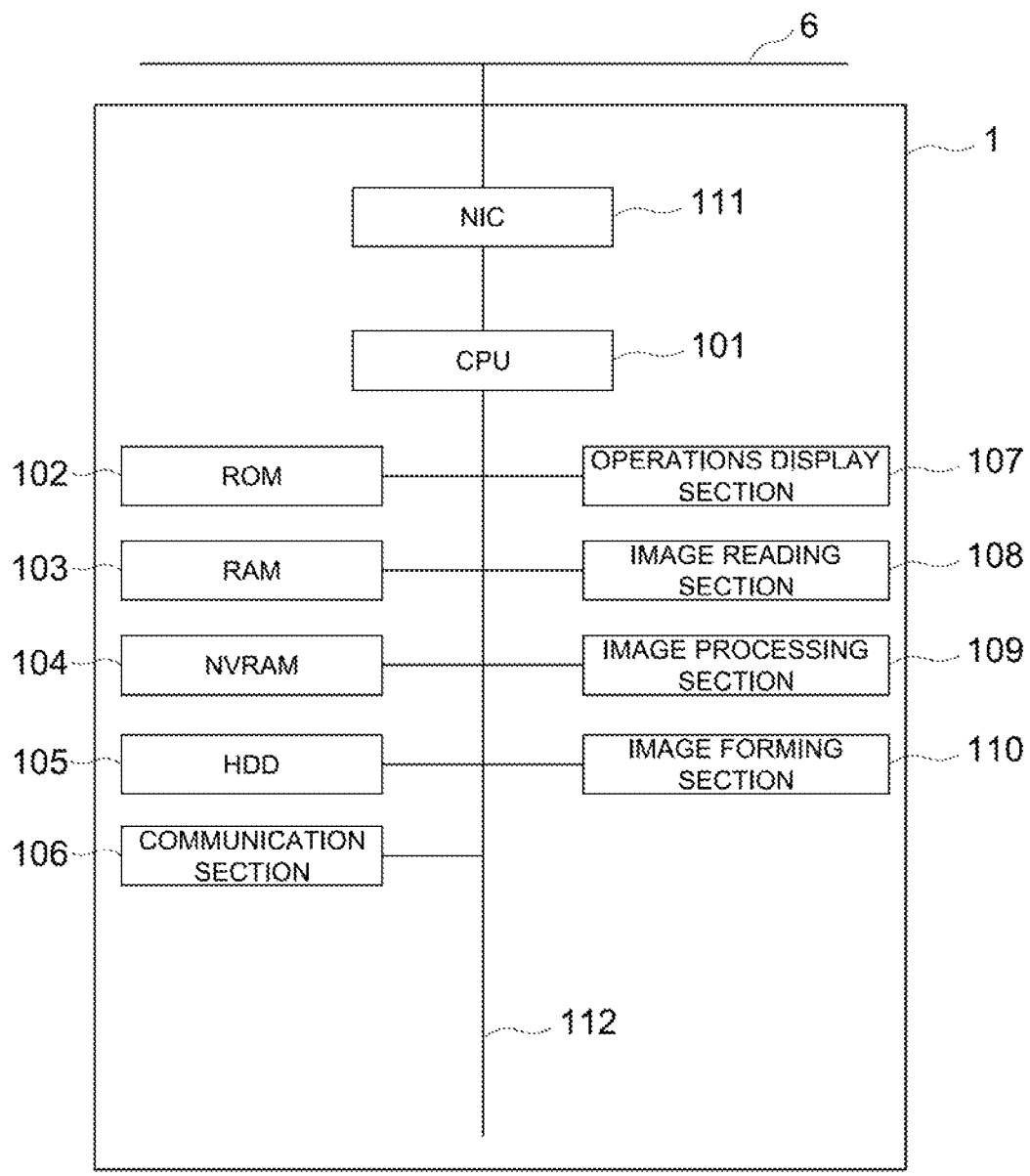
FIG. 2 is a block diagram showing a control system of an information processing apparatus.

FIG. 2 is a block diagram showing the control system of the information processing apparatus 1 and shows a typical control configuration.

The CPU (Central Processing Unit) 101 which functions as a retrieval section and control section, controls all the operations of the information processing apparatus 1 and is connected to the ROM (Read Only Memory) 102 and the RAM (Random Access Memory) 103 via the system bus 112. The CPU 101 reads out the various control programs stored on the ROM 102 and loads them into the RAM 103 and thereby controls each of the sections. In addition, the CPU 101 performs the various processes according to the program loaded into the RAM 103 and the processing results are stored in the RAM 103 and displayed in the operations display section 107. In addition, the processing results stored in the RAM 103 are saved at a prescribed destination.

The network interference card (NIC) 111 is the interface between the system bus 112 and the LAN 6, and the information processing apparatus 1 is connected to the LAN 6 via the NIC 111.

The ROM 102 stores the programs and data and the like in advance, and the recording media comprises magnetic or optical recording media or semiconductor memory. The information processing program of the present invention is stored in the ROM 102.

The RAM 103 forms a work area for temporarily storing data and the like processed by the various control programs executed by the CPU 101.

NVRAM 104 is nonvolatile memory. Even when the power source of information processing apparatus 1 is OFF, the data stored in the NVRAM 104 is not erased.

The HDD 105 that functions as the data storage section performs the functions of storing the image data read at the image reading section 108 and storing the output image data. The structure is such that a plurality of metal disks that have been coated or deposited with a magnetic substance are overlapped at a fixed interval and these are rotated at a high speed using a motor and brought close to a magnetic head to read and write data.

The communication section 106 is communication interface which performs data communication with other devices and may be formed of a USB (Universal Serial Bus) or IEEE1284 or IEEE1394, or PCMCIA or the like.

The operation display section 107 allows various settings. The operation display section 107 may be a touch panel type for example, and the user can input various information via the operation display section 107. The setting for the boxes described hereinafter can also be executed via the operation display section 107. In addition, various information such as the network setting information is displayed in the operation display section 107.

The image reading section 108 reads the document image optically and converts them to electrical signals.

The image data created by the image reading section 108 and the image data sent via the LAN 6 are subjected to image processing by the image processing section 109. Specifically, the gradient reproduction properties are corrected and screen processing of the halftone dots and the like is performed by referring to the density correction LUT and edge processing for adjusting the fine lines is also performed.

The image forming section 110 forms images on the sheet based on the image data that was subjected to image processing by the image processing section 109.

Figure 3:
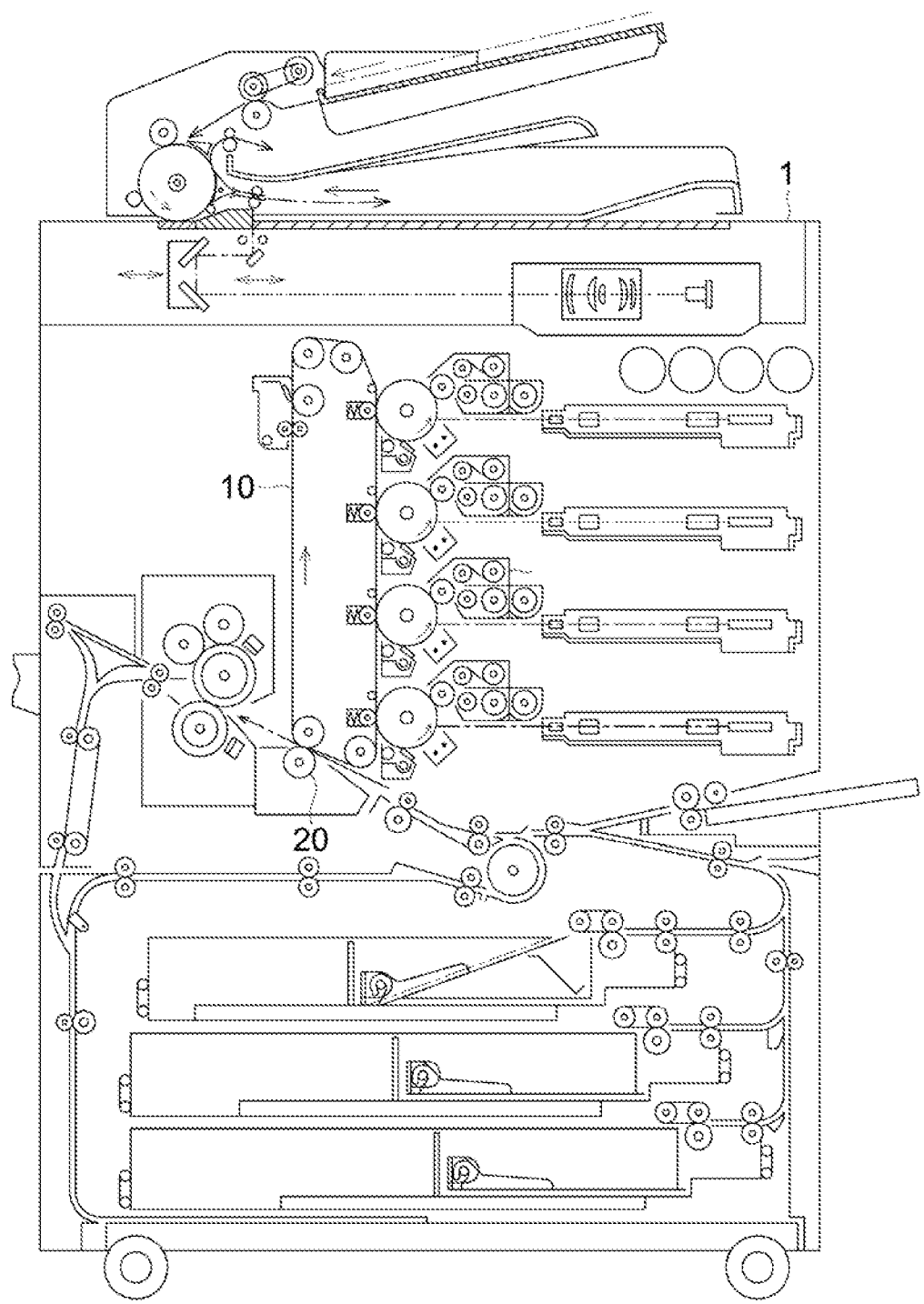
FIG. 3 is a central brief block diagram showing an example of an internal configuration of an information processing apparatus.

As shown in FIG. 3, for example, the information processing apparatus 1 may have a structure capable of printing, copying and faxing. After yellow, magenta, cyan, and black toner images are formed on a plurality of photoreceptors, the respective toner images are transferred onto the intermediate transfer belt 10 and a color image is formed on the intermediate transfer belt 10. Then, the color image is transferred onto a sheet in the transfer section 20 and color image formed on the sheet. It is to be noted that the structure of the information processing apparatus 1 is not limited to a structure such as that shown in FIG. 3 and, as a matter of course, may be a structure dedicated to black and white image formation, and any image forming system aside from the electrophotographic system may also be used.

A portion of the storage region in the HDD 105 of the information processing apparatus 1 may be set as a dedicated storage region for a prescribed user. This dedicated storage region is called a box. For example, in the case where a person called A sets a box dedicated to himself or herself, A can store his or her own data in his or her own dedicated box. (In this example, A is the owner of the box and A is a authorized person to access the data inside the box.)

Most of the data stored in the box is important data for the box owner and the box owner does not wish to have this data stolen by a third party. Thus, the setting is such that a password is required in the case where the data stored in the box is accessed from the external terminal 2A and the like via the LAN 6, or in the case where the content of the box (which is one example of the data storage locations) is viewed.

However, if a third party finds out the password, the third party may pretend to be an owner of the box, and access the data stored inside the box. In this case the data stored in the box cannot be considered to be sufficiently secure.

As a result a determination is made as to whether data access will be permitted based on whether the password is authenticated and on the unique identification information of the external terminal that was accessed and the position information of the person authorized to access which is the box owner. (The position information indicates whether the owner of the box is present in the room α in which the external terminal 2A or the like is set up.) A determination is also made as to whether another password is required. These operations are described in detail in the following.

First, the operation of setting up the box in the information processing apparatus 1 will be described.

In the case where a box is set up in the information processing apparatus 1, it is necessary to set at least box owner name (information of access-authorized person); box name; first password (prescribed authentication information or prescribed first authentication information); second password (prescribed second authentication information); owner terminal information (unique information for the external terminal which an access-authorized person uses); and the second registration terminal information (second external terminal information) and the like as the box attribute information. The second registration terminal is the terminal (second terminal) required for inputting the second password from the information processing apparatus 1.

The IP address may be used as the owner terminal information, but there is a possibility that the IP address may be rewritten, and in that case it may not be used as information for determining whether a terminal is the terminal of the box owner. Therefore, the MAC address (media access control address) is used. The MAC address is the unique identification information for the external terminal and because it is not easily rewritten, it can be used as information for determining whether a terminal is the terminal of the box owner.

It is possible to perform the box setting via the operation display section 107, and the box user name, the box name and the like are input via the operation display section 107. In the case where the MAC address is set as the owner terminal information, the information processing apparatus 1 communicates with the owner terminal and obtains the MAC address based on the IP address set via the operation display section 107. This point will be explained based on the flowchart of FIG. 4.

First when the box is created (Step S1), a determination is made as to whether there is setting information for the DNS server in the information processing apparatus 1 (Step S2). The setting for the DNS (Domain Name System) server is performed at the time of initial setting of the information processing apparatus 1. The DHCP (Dynamic Host Configuration Protocol) server is started up inside the information processing apparatus 1 and the DHCP server makes a decision as to which DNS server to request assignment of an IP address.

In the case where there is no setting information for the DNS server, because the IP address cannot be obtained from the domain name, the information processing section 1 obtains the IP address of the user terminal using the information input by the user (Step S3).

On the other hand, in the case where there is setting information for the DNS server, a selection screen for selecting whether to input the IP address is displayed in the operation display section 107 and user selection is awaited (Step S4). In the case of a selection to input IP address (Yes in Step S4), the IP address for the owner terminal is obtained using information input by the user (Step S5). On the other hand, in the case of a selection to not input the IP address, (No in Step S4), the domain name for the owner terminal is obtained using information input by the user (Step S6), a search is done in the DNS server based on the obtained domain name and the IP address is obtained (Step S7).

When the IP address of the owner terminal is obtained by Step S3, Step S5 and Step S7, the owner terminal is accessed from the information processing apparatus 1 based on the obtained IP address and the MAC address for the owner terminal is requested (step S8). The MAC address is then received from the owner terminal (Step S9), and setting of the MAC address for the owner terminal ends (Step S10). The communication between the information processing apparatus 1 and the owner terminal is done by the ARP (address resolution protocol) and the information processing apparatus 1 obtains the MAC address.

Figure 4:
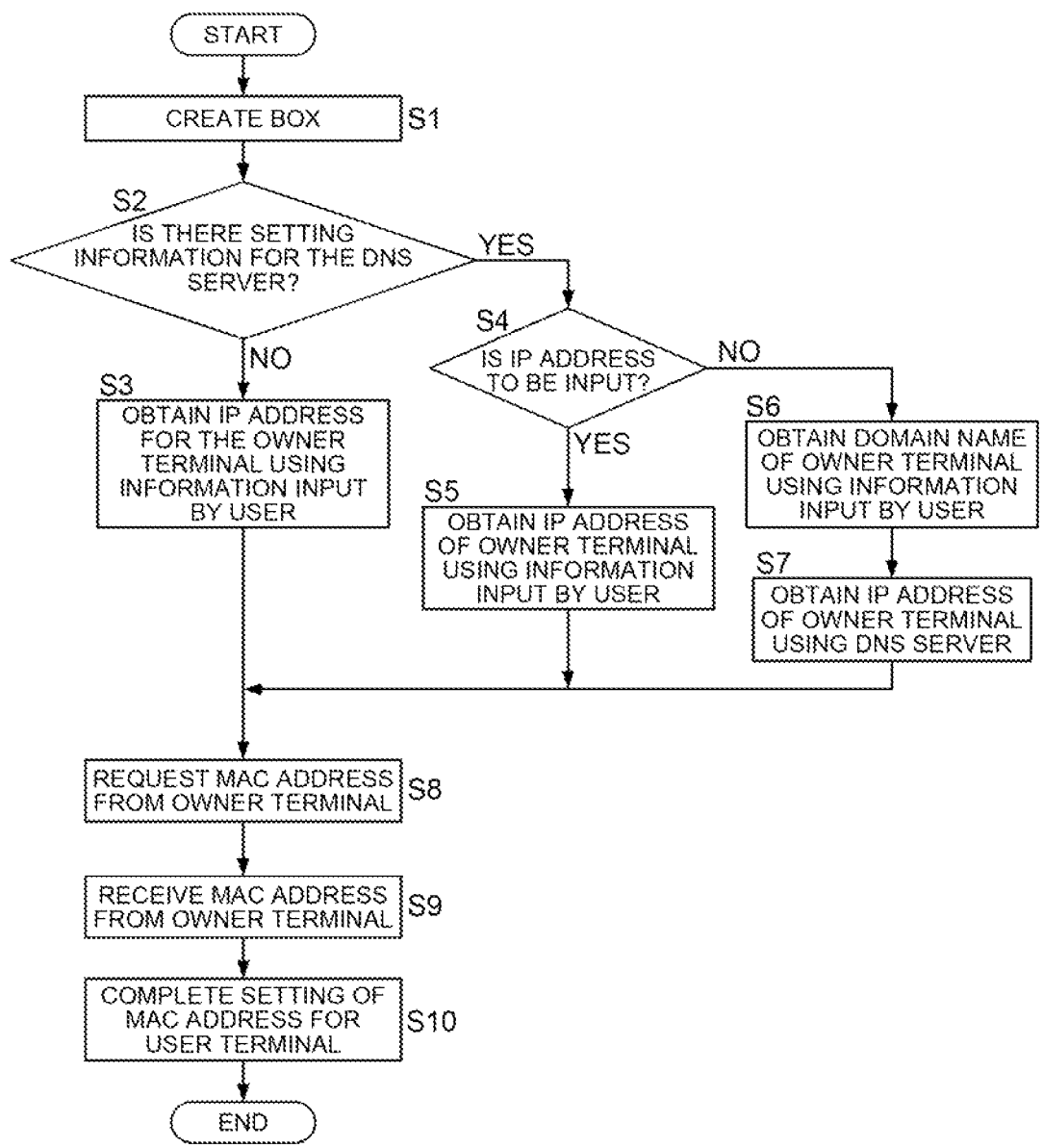
FIG. 4 is a flowchart for explaining operations for acquiring a MAC address by conducting a communication from an information processing apparatus to an owner terminal.

In the case where any one of the external terminals connected with the LAN 6 (see FIG. 1) is set as the second registration terminal, the MAC address is set as the second registration terminal information by an operation like that in the flowchart of FIG. 4.

It is to be noted that the information processing apparatus 1 may be accessed via the LAN 6 from the owner terminal (for example 2A in FIG. 1) and box setting performed.

An example of the attribute information of the box that was set is shown in Table 1.

word is sent to the cellular phone terminal 4 from the information processing apparatus 1. The electronic mail includes a URL for accessing the information processing apparatus 1, and this URL is accessed from the cellular phone terminal 4, and the second password is input. Also, telephone number may be registered in place of mail address. The configuration may also be such that a telephone call is made to the cellular phone terminal 4 from the information processing apparatus 1, and the second password is input in accordance with audio guidance. In addition, if telephone contact is not made, electronic mail may be sent.

One setting item which is the expiry date of the box is the time when the box is automatically deleted, and in the example shown in Table 1, the box is automatically deleted on the Jan. 1, 2007.

Another example of the attribute information for the set box is shown in Table 2.

TABLE 1

| Box Owner | Box Name | First Password | Owner Terminal | | Second Password | Second Registration Terminal | Expiry Date |
|---|---|---|---|---|---|---|---|
| | | | MAC address | IP address | | Mail address | |
| A | Office Work | AA123 | 11-22-FF-44-EA-66 | 10.12.12.160 | aa123 | a.bcdef@eeee.ne.jp | Jan. 01, 2007 |

TABLE 2

| Box Owner | Box Name | First Password | Owner Terminal | | Second Password | Second Registration Terminal | | Expiry Date |
|---|---|---|---|---|---|---|---|---|
| | | | MAC address | IP address | | MAC address | IP address | |
| B | Patents | BB123 | 11-22-FF-44-EA-77 | 10.12.12.170 | bb123 | 11-22-FF-44-EA-02 | 10.17.17.170 | Feb. 02, 2008 |
| B | Meetings | CC123 | 11-22-FF-44-EA-77 | 10.12.12.170 | cc123 | 11-22-FF-44-EA-77 | 10.12.12.170 | Mar. 03, 2008 |

Table 1 shows the box attribute information in which the box owner is "A" and the box name is "Office Work". The first password is the password that is requested when this box was first accessed, and the password "AA123" is set. In addition, the IP address and the MAC address are set respectively for the owner terminal which the terminal of the owner "A" of this box.

A second password which is separated from the first password is also set in order to ensure sufficient security of the data. "aa123" is set as the second password.

The mail address of cellular phone terminal 4 (see FIG. 1) is set as the second registration terminal that requests input of the second password in Table 1. In the case where input of the second password in the information processing apparatus 1 is required, electronic mail requesting input of the second pass- The attribute information of the box shown in Table 2 is almost the same as the attribute information of the box shown in Table 1, but in the attribute information of the box shown in Table 2, the setting contents of the second registration terminal are the IP address and the MAC address. That is to say, the setting is such that the second password is requested from a prescribed external terminal that is connected to the LAN 6.

The box with the box name "Patents" has owner terminal setting content which is different from the second registration terminal setting content, and the setting is such that input of the second password is requested at an external terminal which is different from the owner terminal. The box with the box name "Meetings" has owner terminal setting content which is the same as the second registration terminal setting content, and the setting is such that input of the second password is requested at an external terminal which is the same as the owner terminal.

The box attribute information shown in Table 1 and Table 2 is stored in the NVRAM 104 of the information processing apparatus 1 as an authentication table, but it may be stored in a device which can communicate with the information processing apparatus 1 (such as the shared server 3).

Next, the operation when there is access from the external terminal to the data stored in the box will be described using FIG. 5-FIG. 7.

Figure 5:
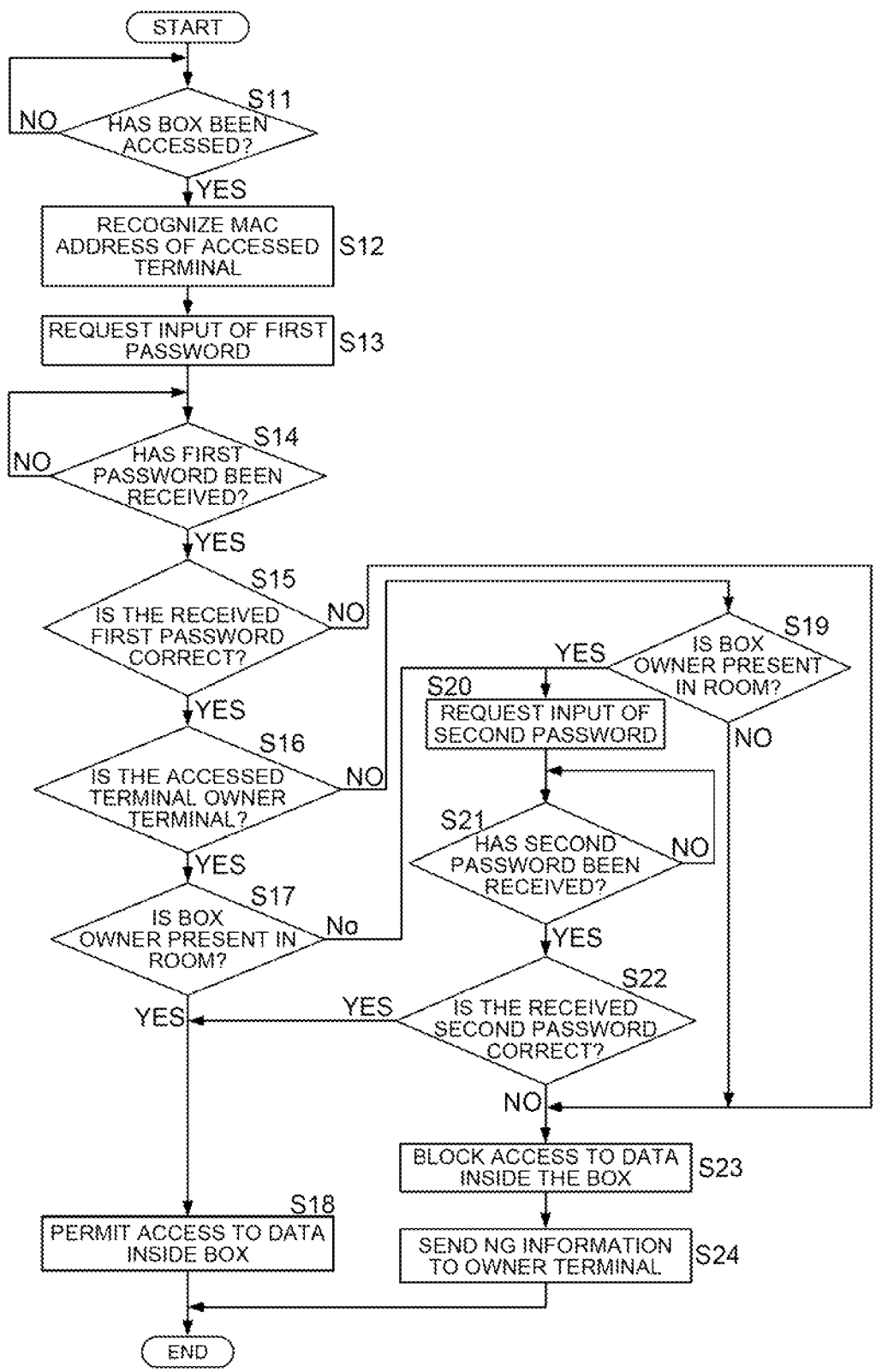
FIG. 5 is a flowchart for describing an operation of determining whether access to data stored in a box is permitted from an external terminal.

FIG. 5 is a flowchart for describing the operation of determining whether access to the data stored in the box is permitted from the external terminal.

First, checking is done to determine whether there was access from the external terminal to the box set at the information processing apparatus 1 via the LAN 6 (Step S11). In the case where results of the checking indicate that there was access from the external terminal, the MAC address of the external terminal that was accessed is recognized (Step S12). This recognition is executed by the CPU 101 using a prescribed program.

Next, in order that the data stored in the box is not stolen by a third party, input of a first password (authentication information or first authentication information) at the external terminal that has been accessed from the information processing apparatus 1 is requested (Step S13). A determination is then made as to whether input of the first password from the external terminal that has been accessed has been received (Step S14), and in the case where input of the first password has been received, a determination is made as to whether the first password is correct (Step S15). This determination is done by whether the received first password is the same as first password registered in the authentication table.

If the received first password is not correct (No in Step S15), a decision is made to block access from the external terminal to the data inside the box (Step S23). Next, there is access from the external terminal, and NG information indicating authentication of the first password has failed is sent from the information processing apparatus 1 to the owner terminal. By performing this type of operation, the owner of the box can recognize when there is dangerous access to data inside the box.

On the other hand, in the case where the received password is correct (Yes in Step S15), a determination is made as to whether the external terminal that has been accessed is the owner terminal registered in the box authentication table (Step S16). If there is access from the owner terminal registered in the box authentication table, it is probable that the box owner accesses to the external terminal, and a determination is made that access is secure. This determination is done by comparing the MAC address that was recognized in Step S12 with the MAC address of the owner terminal registered in the box authentication table.

If a determination is made that the accessed external terminal is the owner terminal (Yes in Step 16), a determination is made as to whether the box owner who is a person authorized to access the room α (See FIG. 1) in which the external terminal 2A is installed is present in the room (the determination process is Step 17). That is to say, the information processing apparatus 1 obtains position information of an access-authorized person. This determination is also performed in order to determine whether access to the data inside the box is secure. The CPU 101 of the information processing apparatus 1 performs the determination (of Step 17) of whether the box owner is present in the room α according to the information of which the CPU has obtained from the entry and exit management system 1.

In the determination of Step S17, if it is determined that the box owner is present in room α, the determination results in the Step S15-Step S17 is that the first password is correct and the external terminal that was accessed is the owner terminal, and the box owner is present in room α. It is thus probable that the box owner has accessed the data inside the box, and a determination is made that the danger of data theft by a third party is low. As a result, a decision is made to permit access to the data inside for the external terminal that has been accessed (Step S18). The CPU 101 that has made the decision to permit access controls the operation of HDD 105, and it is possible to view the data in the box at the external terminal that has been accessed.

Meanwhile, in the determination of Step S17, if it is determined that the box owner is not present in room α, the determination results in the Step S15-Step S17 is that the first password is correct and the external terminal that was accessed is the owner terminal, and the box owner is not present in room α. Thus, a determination is made that the box owner has not accessed the data inside the box, and thus a second password for further ensuring security is requested (request step is Step S20). The second password is requested to the second registration terminal that is registered in the box authentication table.

Input of the second password is accepted (Yes in Step S21) and in the case where the second password is correct (Yes in Step S22), a determination can be made that access may be permitted as access is authorized by the box owner, and thus access to the data inside the box is permitted for the external terminal (Step 18 is the permission step). On the other hand, in the case where the second password is not correct (No in Step S22), there is the danger of data theft by a third party and thus access to the data inside the box from the external terminal is blocked (Step S23).

By providing the operation of Step S20-Step S22, in the case of "No" in Step S17 or in the case of "Yes" in Step S19, access to the data inside the box is not blocked and the process for permitting access becomes possible.

The process will be described by returning to Step S16. If a determination is made that the accessed external terminal is not the owner terminal (No in Step S16), as is the case in Step S17, a determination is made as to whether the box owner is present in the room α (FIG. 1) in which the information processing apparatus 1 is installed (Step 19 is the determination step).

In addition, if it is determined that the box owner is not present in room α according to the determination of Step 19, the determination results of Step S15, Step S16, and Step S19 are that the first password is correct and the accessed external terminal is not the owner terminal, and the box owner is not in the room α. Thus because there is a danger of data theft by a third party, access to the data inside the box from the external terminal is blocked (Step S23).

On the other hand, if it is determined that the box owner is present in room α according to the determination of Step 19, the determination results of Step S15, Step S16, and Step S19 are that the first password is correct and the accessed external terminal is not the owner terminal, and the box owner is present in the room α. Thus, there is a possibility that the box owner is accessing the data inside the box from an external terminal other than owner terminal, and thus input of a second password for further ensuring security is requested (Step S20). Steps subsequent to Step S20 are as described above.

Figure 6:
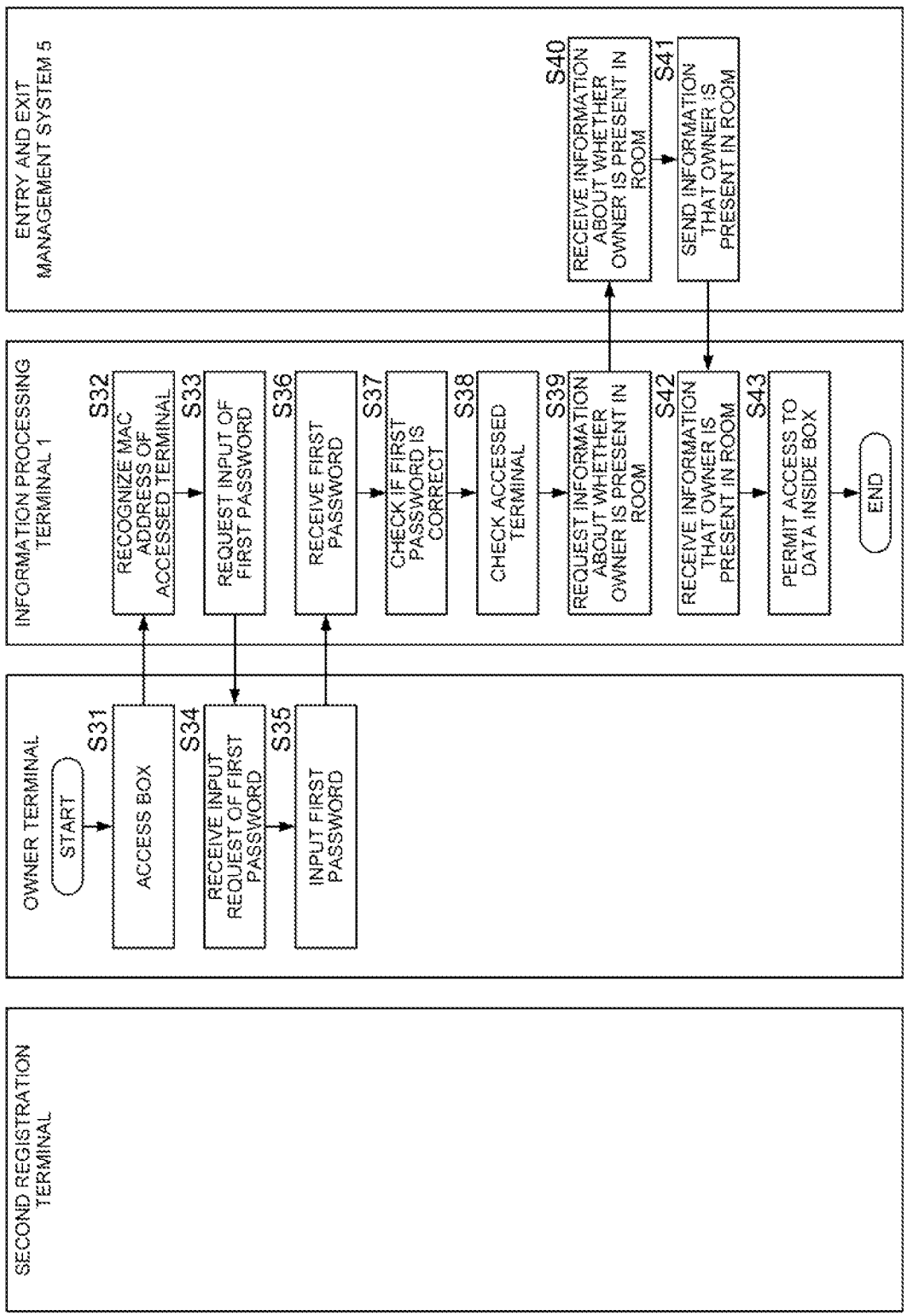
FIG. 6 is a schematic diagram when an owner terminal accesses to data stored in a box.
Figure 7:
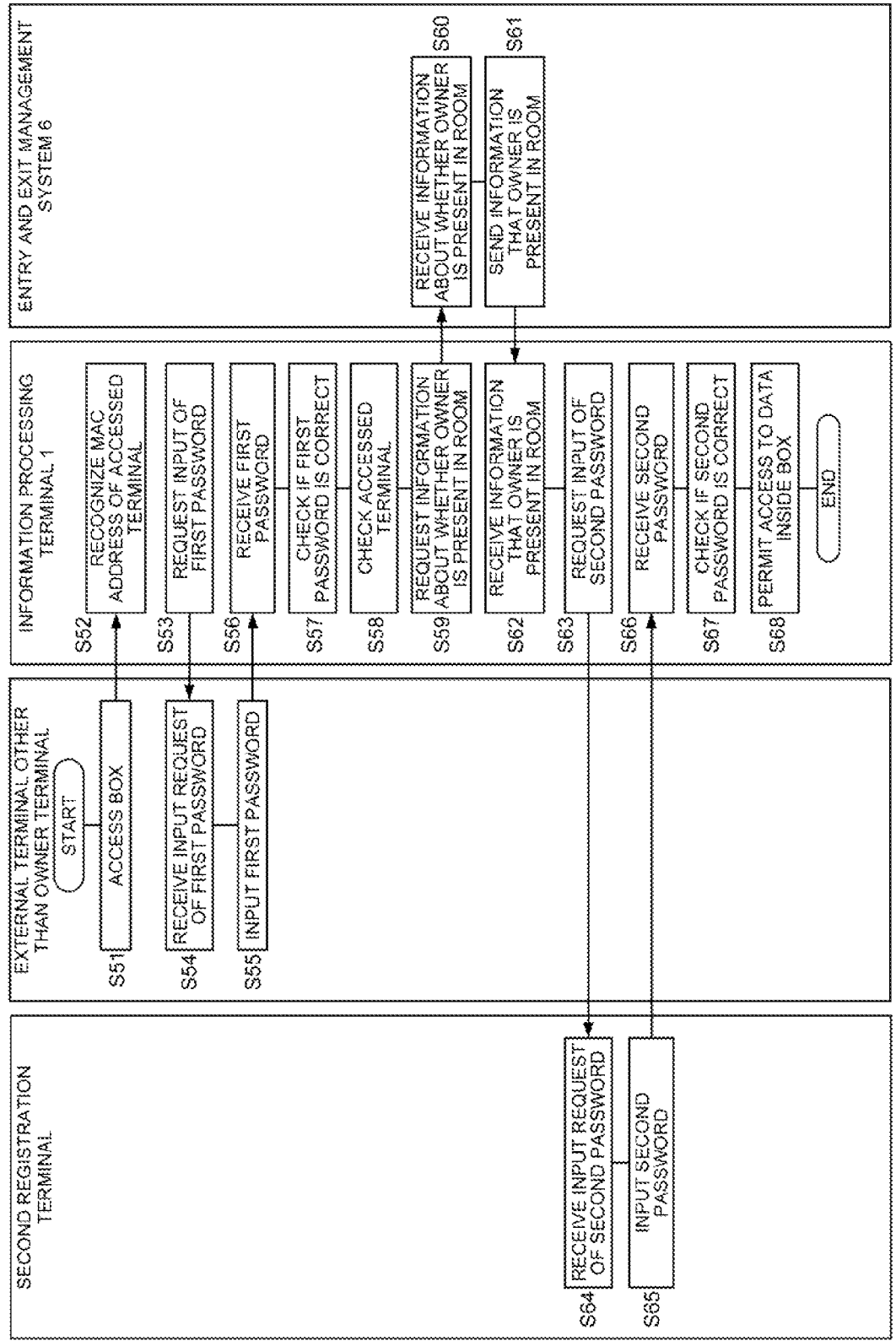
FIG. 7 is a schematic diagram when an external terminal, which is not registered in an authentication table of a box, accesses to data stored in a box.

The operation is the same as that shown in FIG. 5, but FIG. 6 and FIG. 7 is a pattern diagram showing an example of the relationship between the information processing apparatus 1 and the entrance and exit management system 5 and the like.

FIG. 6 is a pattern diagram of the case where the data inside the box is accessed from the owner terminal.

In the case where the box set up in the information processing apparatus 1 is accessed from the owner terminal (Step S31), MAC address of the accessed external terminal is recognized at the information processing apparatus (Step S32), and input of the first password is requested (Step S33).

The input request for the first password is received at the owner terminal (Step S34), and when the first password is input (Step S35), the information processing apparatus 1 receives the first password (Step 36), and the first password is checked to determine if it is correct (Step S37). Here, it is assumed that the input first password was correct.

The external terminal which accessed the information processing apparatus 1 is checked based on the MAC address recognized in Step S32. In this case it is assumed that the accessed external terminal is recognized as the owner terminal.

Information about whether the box owner is present in the room α is requested to the entry and exit management system 5 (Step S39). The entry and exit management system 5 receives this request (Step S40), and when there is confirmation that the box owner is present in room α, information that the box owner is present in the room is sent to the information processing apparatus 1 (Step S41).

When the information processing apparatus 1 receives information that the box owner is present in the room (Step S42), it is confirmed that the first password is correct, the accessed external terminal is the owner terminal, and the information processing apparatus 1 can recognize that the box owner is present in the room α. Thus it is probable that the box owner is accessing the data inside the box, and it can be determined that the danger of data theft by a third party is low and access to the data inside the box is permitted for the external terminal (Step S43).

FIG. 7 is a pattern diagram showing the case where the data inside the box is accessed from an external terminal that is not registered in the box authentication table.

Step S51-Step 57 in FIG. 7 are the same as Step S31-Step S37, and it is assumed that the first password was correct in the determination of Step S57.

In addition, Step S58 in FIG. 7 and Step S38 in FIG. 6 are the same, and it is assumed that the accessed external terminal is not the owner terminal in the determination of Step S58. Also Step S59-Step S62 in FIG. 7 are the same as Step S39-Step S42 in FIG. 6.

At the point where the operation of Step S62 is complete, information processing apparatus 1 can recognize that the first password is correct, the accessed external terminal is not the owner terminal, and the box owner is present in the room α. Thus there is a possibility that the box owner is not accessing the data inside the box and therefore input of a second password for further ensuring security is requested to the second registration terminal (Step S63).

Input request for the second password is received at the second registration terminal (Step S64), and when the second password is input (Step S65), the information processing apparatus 1 receives the second password (Step S66), and the second password is checked to determine if it is correct (Step S67). Here it is assumed that the input second password was correct.

When it is determined that the second password is correct, the information processing apparatus 1 can determine that the possibility of which the box owner is accessing the data inside the box is high and the possibility of which the danger of data stolen by a third party is low. As a result, access to the data inside the box for the external terminal that has been accessed is permitted (Step S68).

As described above, after the first password is authenticated and a decision as to whether to allow access is made based on a unique identification information of the external terminal accessed and the position information of the access-authorized person who is the box owner, theft of the stored data by a third party who assumes the identity of the person authorized to access, is prevented and the data can be securely managed.

Also, in addition to authenticating the first password, if a decision is made about whether to request a second password as well based on unique identification information of the external terminal accessed and the position information of the box owner, data can be securely managed in the same manner.

It is to be noted that the present invention is not to be limited by this embodiment, and modifications and additions are included in the present invention provided they do not depart from the concept of the present invention.

The information processing apparatus 1 is not limited to a device that can output images on a sheet, and can be any device provided that it stores data.

In addition, a specific person for inputting the second password may be decided on in advance and the terminal of that specific person may be registered in the authentication table as the second registration terminal for inputting the second password.

According to the information processing apparatus and the information processing program disclosed in the present invention, data theft of a third party who pretends to be an access-authorized person is prevented and data can be securely managed.

While the preferred embodiments of the present invention have been described using specific term, such description is for illustrative purpose only, and it is to be understood that changes and variations may be made without departing from the spirit and scope of the appended claims.

What is claimed is:

1. An information processing apparatus that is accessible from an external terminal device, comprising:
   a data storage section that is provided with a plurality of storing areas to each of which an accessing operation is restricted, and which are correlated to plural sets of first identification information, being inherent to external terminal devices to be used by access-authorized persons, respectively;
   a first acquiring section to acquire second identification information inherent to one of the external terminal devices from said one of the external terminal devices concerned;
   a second acquiring section to acquire positional information of one of the access-authorized persons, being correlated to one of the storing areas, from an apparatus other than said one of the external terminal devices; and
   a control section that determines whether or not the accessing operation for accessing to said one of the storing areas from said one of the external terminal devices should be allowed, and then, controls the accessing operation based on a determined result thereof;
   wherein, when a current operator tries to access a first storing area among the plurality of storing areas from a specific external terminal device, being any one of the external terminal devices, the control section transmits a message for requesting the current operator to input authentication information so as to send the authentication information inputted by the current operator back to the control section; and
   wherein, when the authentication information, inputted by the current operator currently operating the specific external terminal device, coincides with predetermined authentication information, the control section allows the current operator to conduct the accessing operation from the specific external terminal device, in response to facts that the second identification information, acquired from the specific external terminal device by the first acquiring section, coincides with first identification information correlated to the first storing areas, and the positional information of the access-authorized person correlated to the first storing area, which is acquired by the second acquiring section from the apparatus other than the specific external terminal device, fulfills a predetermined condition;

wherein the positional information represents whether the access-authorized person is present or absent in a site into which the specific external terminal device is installed.

2. The information processing apparatus of claim 1, wherein the control section determines whether or not the accessing operation to be conducted by the specific external terminal device should be allowed, by employing an authentication table in which the predetermined authentication information and the first and second identification information inherent to the specific external terminal device to be used by the access-authorized person are registered.

3. The information processing apparatus of claim 1, wherein the first and second identification information is information of a MAC (Media Access Control) address of the specific external terminal device.

4. An information processing apparatus that is accessible from an external terminal device, comprising:

a data storage section that is provided with a plurality of storing areas to each of which an accessing operation is restricted, and which are correlated to plural sets of first identification information, being inherent to external terminal devices to be used by access-authorized persons, respectively;

a first acquiring section to acquire second identification information inherent to one of the external terminal devices from said one of the external terminal devices concerned;

a second acquiring section to acquire positional information of one of the access-authorized persons, being correlated to one of the storing areas, from an apparatus other than said one of the external terminal devices; and a control section that determines whether or not the accessing operation for accessing to said one of the storing areas from said one of the external terminal devices should be allowed, and then, controls the accessing operation based on a determined result thereof;

wherein, when a current operator tries to access a first storing area among the plurality of storing areas from a specific external terminal device, being any one of the external terminal devices, the control section transmits a message for requesting the current operator to input first authentication information so as to send the first authentication information inputted by the current operator back to the control section; and wherein, when the authentication information, inputted by the current operator currently operating the specific external terminal device, coincides with predetermined authentication information, the control section further transmits another message for requesting the current operator to input second authentication information, being different from the first authentication information, in response to facts that the second identification information, acquired from the specific external terminal device by the first acquiring section, coincides with first identification information correlated to the first storing area, and the positional information of the access-authorized person correlated to the first storing area, which is acquired by the second acquiring section from the apparatus other than the specific external terminal device, does not fulfill a predetermined condition, or, in response to facts that the second identification information, acquired from the specific external terminal device by the first acquiring section, does not coincide with first identification information correlated to the first storing area, and the positional information of the access-authorized person correlated to the first storing area, which is acquired by the second acquiring section from the apparatus other than the specific external terminal device, fulfills a predetermined condition;

wherein the positional information represents whether the access-authorized person is present or absent in a site into which the specific external terminal device is installed.

5. The information processing apparatus of claim 4, wherein the control section determines whether or not the request of inputting second authentication information should be transmitted to the specific external terminal device, by employing an authentication table in which the first predetermined authentication information and the first and second identification information inherent to the specific external terminal device to be used by the access-authorized person are registered.

6. The information processing apparatus of claim 5, wherein second predetermined authentication information is also registered in the authentication table; and wherein, when the control section transmits the request of inputting the second authentication information to the specific external terminal device, and then, the second authentication information inputted by the specific external terminal device coincides with the second predetermined authentication information registered in the authentication table, the control section determines that the accessing operation to be conducted by the current operator from the specific external terminal device should be allowed.

7. The information processing apparatus of claim 5, wherein information of another external terminal device for requesting an inputting operation of the second authentication information is registered in the authentication table; and wherein, when determining that the request of inputting second authentication information should be transmitted, the control section transmits the request of inputting second authentication information to the other external terminal device.

8. The information processing apparatus of claim 4, wherein, when the control section transmits the request of inputting the second authentication information to the specific external terminal device, and then, the second authentication information inputted by the specific external terminal device coincides with second predetermined authentication information, the control section determines that the accessing operation to be conducted by the current operator from the specific external terminal device should be allowed.

9. The information processing apparatus of claim 4, wherein the first and second identification information is information of a MAC (Media Access Control) address of the specific external terminal device.

10. A non-transitory computer readable medium storing a computer executable program for conducting information processing operations to be implemented in an information processing apparatus that is accessible from an external terminal device, the program comprising program code for causing a computer to perform the steps of:
  providing a data storage section that is provided with a plurality of storing areas to each of which an accessing operation is restricted, and which are correlated to plural sets of first identification information, being inherent to external terminal devices to be used by access-authorized persons, respectively;
  acquiring second identification information inherent to one of the external terminal devices from said one of the external terminal devices concerned;
  acquiring positional information of one of the access-authorized persons, being correlated to one of the storing areas, from an apparatus other than said one of the eternal terminal devices; and
  determining whether or not the accessing operation for accessing to said one of the storing areas from said one of the external terminal devices should be allowed, and then, controlling the accessing operation based on a determined result thereof;
  wherein, when a current operator tries to access a first storing area among the plurality of storing areas from a specific external terminal device, being any one of the external terminal devices, a message for requesting the current operator to input authentication information is transmitted so as to send the authentication information inputted by the current operator back to the control section; and
  wherein, when the authentication information, inputted by the current operator currently operating the specific external terminal device, coincides with predetermined authentication information, allowing the current operator to conduct the accessing operation from the specific external terminal device, in response to facts that the second identification information, acquired from the specific external terminal device by the first acquiring section, coincides with first identification information correlated to the first storing area, and the positional information of the access-authorized person correlated to the first storing area, which is acquired by the second acquiring section from the apparatus other than the specific external terminal device, fulfills a predetermined condition;
  wherein the positional information represents whether the access-authorized person is present or absent in a site into which the specific external terminal device is installed.

11. The non-transitory computer readable medium of claim 10,
  wherein it is determined whether or not the accessing operation to be conducted by the specific external terminal device should be allowed, by employing an authentication table in which the predetermined authentication information and the fit and second identification information inherent to the specific external terminal device to be used by the access-authorized person are registered.

12. The non-transitory computer readable medium of claim 10,
  wherein the first and second identification information is information of a MAC (Media Access Control) address of the specific external terminal device.

13. A non-transitory computer readable medium storing a computer executable program for conducting information processing operations to be implemented in an information processing apparatus that is accessible from an external terminal device, the program comprising program code for causing a computer to perform the steps of:
  providing a data storage section that is provided with a plurality of storing areas to each of which an accessing operation is restricted, and which are correlated to plural sets of first identification information, being inherent to external terminal devices to be sued by access-authorized persons, respectively;
  acquiring second identification information inherent to one of the external terminal devices from said one of the external terminal devices concerned;
  acquiring positional information of one of the access-authorized persons, being correlated to one of the storing areas, from an apparatus other than said one of the external terminal devices; and
  determining whether or not the accessing operation for accessing said one of the storing areas from said one of the external terminal devices should be allowed, and then, controlling the accessing operation based on a determined result thereof;
  wherein, when a current operator tries to access a first storing area among the plurality of storing areas from a specific external terminal device, being any one of the external terminal devices, a message for requesting the current operator to input first authentication information is transmitted so as to send the first authentication information inputted by the current operator back to the control section; and
  wherein, when the authentication information, inputted by the current operator currently operating the specific external terminal device, coincides with predetermined authentication information, the control section further transmits another message for requesting the current operator to input second authentication information, being different from the first authentication information, in response to facts that the second identification information, acquired from the specific external terminal device by the first acquiring section, coincides with first identification information correlated to the first storing area, and the positional information of the access-authorized person correlated to the first storing area, which is acquired by the second acquiring section from the apparatus other than the specific external terminal device, does not fulfill a predetermined condition, or in response to facts that the second identification information, acquired from the specific external terminal device by the first acquiring section, does not coincide with first identification information correlated to the first storing area, and the positional information of the access-authorized person correlated to the first storing area, which is acquired by the second acquiring section from the apparatus other than the specific external terminal device, fulfills a predetermined condition;
  wherein the positional information represents whether the access-authorized person is present or absent in a site into which the specific external terminal device is installed.

14. The non-transitory computer readable medium of claim 13,
  wherein it is determined whether or not the request of inputting second authentication information should be transmitted to the specific external terminal device, by employing an authentication table in which the first predetermined authentication information and the first and second identification information inherent to the specific external terminal device to be used by the access-authorized person are registered.

15. The non-transitory computer readable medium of claim 14,
   wherein second predetermined authentication information is also registered in the authentication table; and
   wherein, when the request of inputting the second authentication information is transmitted to the specific external terminal device, and then, the second authentication information inputted by the external terminal device coincides with the second predetermined authentication information registered in the authentication table, it is determined that the accessing operation to be conducted by the current operator from the specific external terminal device should be allowed.

16. The non-transitory computer readable medium of claim 14,
   wherein information of another external terminal device for requesting an inputting operation of the second authentication information is registered in the authentication table; and
   wherein, when determining that the request of inputting second authentication information should be transmitted, the request of inputting second authentication information is transmitted to the other external terminal device.

17. The non-transitory computer readable medium of claim 13,
   wherein, when the request of inputting the second authentication information is transmitted to the specific external terminal device, and then, the second authentication information inputted by the specific external terminal device coincides with second predetermined authentication information, it is determined that the accessing operation to be conducted by the current operator from the specific external terminal device should be allowed.

18. The non-transitory computer readable medium of claim 13,
   wherein the first and second identification information is information of a MAC (Media Access Control) address of the specific external terminal device.

* * * * *